(12) United States Patent
Farrugia et al.

(10) Patent No.: US 8,504,845 B2
(45) Date of Patent: Aug. 6, 2013

(54) PROTECTING STATES OF A CRYPTOGRAPHIC PROCESS USING GROUP AUTOMORPHISMS

(75) Inventors: Augustin J. Farrugia, Cupertino, CA (US); Mathieu Ciet, Paris (FR); Thomas Icart, Paris (FR)

(73) Assignee: Apple Inc., Cupertino, CA (US)

( * ) Notice: Subject to any disclaimer, the term of this patent is extended or adjusted under 35 U.S.C. 154(b) by 145 days.

(21) Appl. No.: 13/076,362

(22) Filed: Mar. 30, 2011

(65) Prior Publication Data
US 2012/0254625 A1 Oct. 4, 2012

(51) Int. Cl.
*H04L 9/28* (2006.01)
(52) U.S. Cl.
USPC ............................................ 713/189; 380/28
(58) Field of Classification Search
USPC ....................................................... 713/189
See application file for complete search history.

(56) References Cited

U.S. PATENT DOCUMENTS

| | | |
|---|---|---|
| 7,421,076 B2 | 9/2008 | Stein et al. |
| 2003/0110196 A1 | 6/2003 | Stein et al. |
| 2005/0207571 A1 | 9/2005 | Ahn et al. |
| 2005/0213752 A1* | 9/2005 | Hawkes et al. ................. 380/28 |
| 2005/0283714 A1 | 12/2005 | Korkishko et al. |
| 2008/0019503 A1* | 1/2008 | Dupaquis et al. ............... 380/28 |
| 2008/0260145 A1 | 10/2008 | Trichina |
| 2011/0170691 A1* | 7/2011 | Liardet et al. ................. 380/259 |
| 2012/0179919 A1* | 7/2012 | Farrugia et al. ............... 713/193 |

FOREIGN PATENT DOCUMENTS

| WO | WO-2004/070510 A2 | 8/2004 |
|---|---|---|
| WO | WO-2004/070510 A3 | 8/2004 |

\* cited by examiner

*Primary Examiner* — Matthew Smithers
(74) *Attorney, Agent, or Firm* — Adeli & Tollen LLP

(57) ABSTRACT

In the field of computer enabled cryptography, such as a keyed block cipher having a plurality of rounds, the cipher is hardened against an attack by a protection process which obscures the cipher states and/or the round keys using the properties of group field automorphisms and applying multiplicative masks (instead of conventional XOR masks) to the states of the cipher, for encryption or decryption. This is especially advantageous in a "White Box" environment where an attacker has full access to the cipher algorithm, including the algorithm's internal state during its execution. This method and the associated computing apparatus are useful for protection against known attacks on "White Box" ciphers, by eliminating XOR operations with improved masking techniques and increasing complexity of reverse engineering and of attacks.

34 Claims, 3 Drawing Sheets

PROTECTING STATES OF A CRYPTOGRAPHIC PROCESS USING GROUP AUTOMORPHISMS

FIELD OF THE INVENTION

This invention relates to data security and cryptography and to improving the security of computer enabled cryptographic processes.

BACKGROUND

In the field of data Security, there is a need for fast and secure encryption. This is why the AES (Advanced Encryption Standard) cipher has been designed and standardized to replace the DES (Data Encryption Standard) cipher. Cryptographic algorithms are widely used for encryption and decryption of messages, authentication, digital signatures and identification. AES is a well known symmetric block cipher. Block ciphers operate on blocks of plaintext and ciphertext, usually of 64 or 128 bits length but sometimes longer. Stream ciphers are the other main type of cipher and operate on streams of plain text and cipher text 1 bit or byte (sometimes one word) at a time. There are modes of operation (notably the ECB, electronic code block) where a given block is encrypted to always the same ciphertext block. This is an issue which is solved by a more evolved mode of operations, e.g. CBC (cipher block chaining) where a chaining value is used to solve the 1-to-1 map.

AES is approved as an encryption standard by the U.S. Government. Unlike its predecessor DES (Data Encryption Standard), it is a substitution permutation network (SPN). AES is fast to execute in both computer software and hardware implementation, relatively easy to implement, and requires little memory. AES has a fixed block size of 128 bits and a key size of 128, 192 or 256 bits. Due to the fixed block size of 128 bits, AES operates on a 4×4 array of bytes. It uses key expansion and like most block ciphers a set of encryption and decryption rounds (iterations). Each round involves the same processes. Use of multiple rounds enhances security. Block ciphers of this type use in each round a substitution box (s-box). This operation provides non-linearity in the cipher and significantly enhances security.

Note that these block ciphers are symmetric ciphers, meaning the same key is used for encryption and decryption. As is typical in most modern ciphers, security rests with the (secret) key rather than the algorithm. The s-boxes or substitution boxes accept an n bit input and provide an m bit output. The values of m and n vary with the cipher and the s-box itself. The input bits specify an entry in the s-box in a particular manner well known in the field.

Many encryption algorithms are primarily concerned with producing encrypted data that is resistant to decrypting by an attacker who can interact with the encryption algorithm only as a "Black Box" (input-output) model, and cannot observe internal workings of the algorithm or memory contents, etc due to lack of system access. The Black Box model is appropriate for applications where trusted parties control the computing systems for both encoding and decoding ciphered materials.

However, many applications of encryption do not allow for the assumption that an attacker cannot access internal workings of the algorithm. For example, encrypted digital media often needs to be decrypted on computing systems that are completely controlled by an adversary (attacker). There are many degrees to which the Black Box model can be relaxed. An extreme relaxation is called the "White Box" model. In a White Box model, it is presumed that an attacker has total access to the system performing an encryption, including being able to observe directly a state of memory, program execution, modifying an execution, etc. In such a model, an encryption key can be observed in or extracted from memory, and so ways to conceal operations indicative of a secret key are important.

Classically, software implementations of cryptographic building blocks are insecure in the White Box threat model where the attacker controls the execution process. The attacker can easily lift the secret key from memory by just observing the operations acting on the secret key. For example, the attacker can learn the secret key of an AES software implementation by observing the execution of the key schedule algorithm.

Hence there are two basic principles in the implementation of secure computer applications (software). The Black Box model implicitly supposes that the user does not have access to the computer code nor any cryptographic keys themselves. The computer code security is based on the tampering resistance over which the application is running, as this is typically the case with SmartCards. For the White Box model, it is assumed the (hostile) user has partially or fully access to the implemented code algorithms; including the cryptographic keys themselves. It is assumed the user can also become an attacker and can try to modify or duplicate the code since he has full access to it in a binary (object code) form. The White Box implementations are widely used (in particular) in content protection applications to protect e.g. audio and video content.

Software implementations of cryptographic building blocks are insecure in the White Box threat model where the attacker controls the computer execution process. The attacker can easily extract the (secret) key from the memory by just observing the operations acting on the secret key. For instance, the attacker can learn the secret key of an AES cipher software implementation by passively monitoring the execution of the key schedule algorithm. Also, the attacker could be able to retrieve partial cryptographic result and use it in another context (using in a standalone code, or injecting it in another program, as an example).

Content protection applications such as for audio and video data are one instance where it is desired to keep the attacker from finding the secret key even though the attacker has complete control of the execution process. The publication "White-Box Cryptography in an AES implementation" Lecture Notes in Computer Science Vol. 2595, Revised Papers from the 9th Annual International Workshop on Selected Areas in Cryptography pp. 250-270 (2002) by Chow et al. discloses implementations of AES that obscure the operations performed during AES by using table lookups (also referred to as TLUs) to obscure the secret key within the table lookups, and obscure intermediate state information that would otherwise be available in arithmetic implementations of AES. In the computer field, a table lookup table is an operation consisting of looking in a table (also called an array) at a given index position in the table.

Chow et al. (for his White Box implementation where the key is known at the computer code compilation time) uses 160 separate tables to implement the 11 AddRoundKey operations and 10 SubByte Operations (10 rounds, with 16 tables per round, where each table is for 1 byte of the 16 byte long—128 bit—AES block). These 160 tables embed a particular AES key, such that output from lookups involving these tables embeds data that would normally result from the AddRoundKey and SubByte operations of the AES algorithm, except that this data includes input/output permutations that make it more difficult to determine what parts of these tables represent round key information derived from the AES key. Chow et al. provide a construction of the AES algorithm for such White Box model. The security of this construction resides in the use of table lookups and masked data. The input and output mask applied to this data is never removed along the process. In this solution, there is a need for knowing the key value at the compilation time, or at least to be able to derive the tables from the original key in a secure environment.

The conventional implementation of a block cipher in the White Box model is carried out by creating a set of table lookups. Given a dedicated cipher key, the goal is to store in a table the results for all the possible input messages. This principle is applied for each basic operation of the block cipher. In the case of the AES cipher, these are the shiftRow, the add RoundKey, the subByte and the mixColumns operations.

However, Chow et al. do not solve all the security needs for block cipher encryption in a White Box environment. Indeed, the case where the cipher key is derived through a given process and so is unknown at the code compilation time is not addressed by Chow et al. Further, the publication "Cryptanalysis of a White Box AES Implementation" by Olivier Billet et al., in "Selected Areas in Cryptography 2004" (SAC 2004), pages 227-240 is a successful attack on a White Box cipher of the type described by Chow et al., indicating weaknesses in Chow et al.'s approach.

SUMMARY

This disclosure is of a powerful, efficient and new solution to harden the extraction of data from an AES (or other) cipher in a White Box environment by means of a protection process. Further, the present method may be used in a more general case of other cryptographic processes, e.g., encryption or decryption of respectively a plaintext or ciphertext message. The present disclosure therefore is directed to hiding the states of the process in a better way. This disclosure further is of efficient solutions to protect AES (or other cipher) states in a White Box implementation using group field automorphisms and multiplicative masks.

The present protection method masks the state (value) of the cryptographic process at the level of each cipher operation, in terms of the input and output state of each operation or selected operations. In this sense masking means obscuring the "clear" (conventional) value of the state by applying to the state a masking or mask value via a logical or mathematical operation.

While generally such masking is well known, the present method allows application of dynamic (changing) masks values even though the actual cipher operations are kept static (not changing.) The mask values here are applied by an arithmetic multiplication process. The multiplication is performed using conventional mathematical logarithms, so the actual mask function calculations are performed as an addition of two logarithms modulus some integer value.

The present system and method address those cases where there is a need to harden "dynamically" the process against an attacker. This aspect of the present disclosure can be combined with other protection solutions.

DETAILED DESCRIPTION

AES Description

Figure 1:
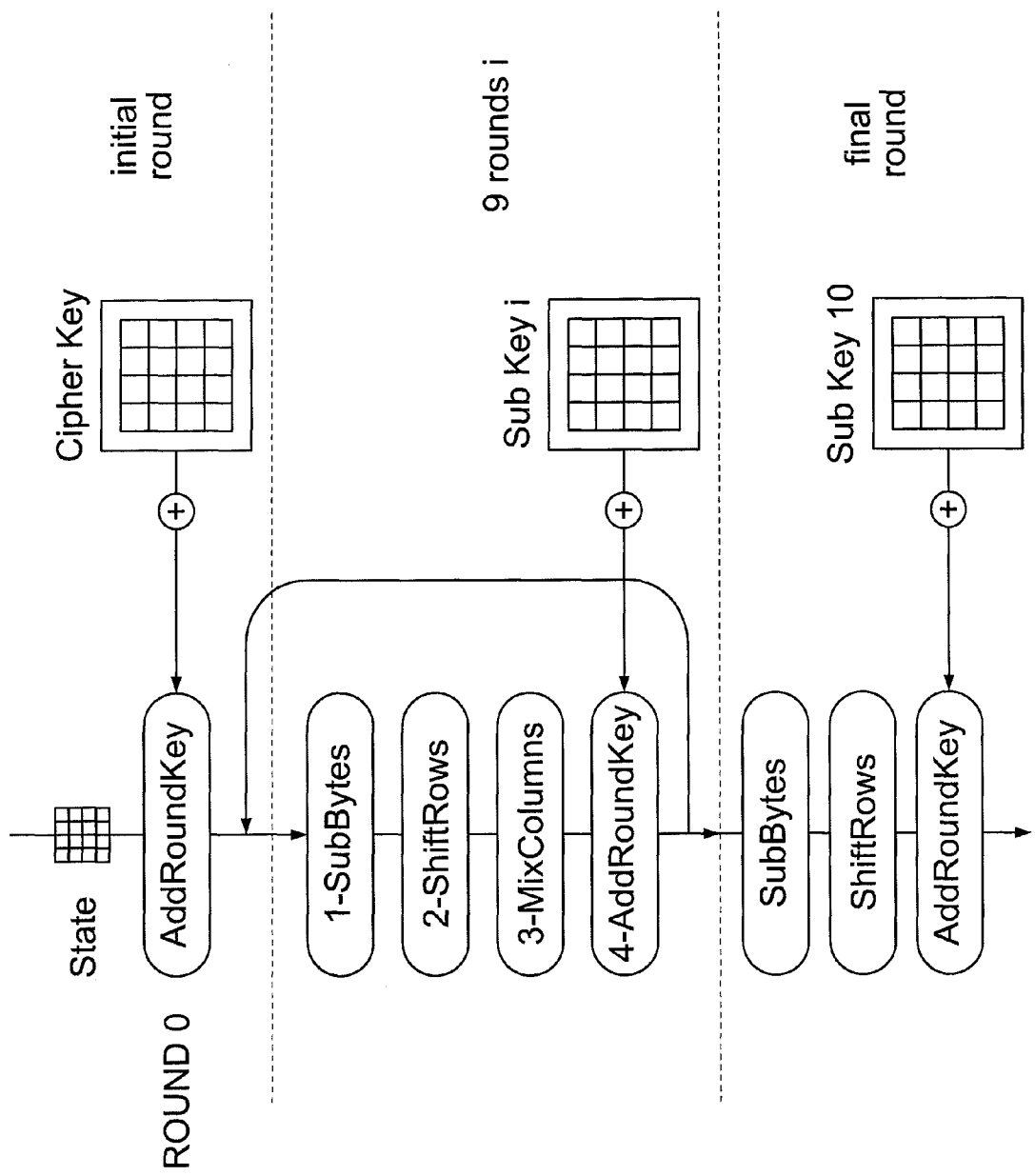
FIG. 1 shows, in the prior art, AES encryption.

See the NIST AES standard for a more detailed description of the AES cipher (Specification for the ADVANCED ENCRYPTION STANDARD (AES), NIST, http://csrc.nist.gov/publications/fips/fips197/fips-197.pdf). The following is a summary of the well known AES cipher. The AES cipher uses a 16 byte cipher key, and has 10 rounds (final plus 9 others). The AES encryption algorithm has the following operations as depicted graphically in prior art FIG. 1 and showing round zero of the 9 rounds:

11 AddRoundKey Operations
10 SubByte Operations
10 ShiftRow Operations
9 MixColumn Operations AES is computed using a 16-byte buffer (computer memory) referred to as the AES "state" in this disclosure and shown in FIG. 1.

To summarize,
(i) AddRoundKeys (ARK) logically XOR (the Boolean exclusive OR operation) some subkey bytes with the state bytes.
(ii) ShiftRows (SR) are a move from one byte location to another.
(iii) MixColums (MC) are a linear table-look up (TLU), applied to 4 bytes.
(iv) SubBytes (SB) are a non-linear TLU, applied to 1 byte.

Preliminarily to the encryption itself, in the initial round in FIG. 1, the original 16-byte cipher key is expanded to 11 subkeys designated K0, . . . , K10, so there is a subkey for each round during what is called the key-schedule. Each subkey, like the original key, is 16-bytes long.

The following explains AES decryption round by round. For the corresponding encryption (see FIG. 1), one generally performs the inverse of each operation, in the inverse order. (The same is true for the cryptographic processes in accordance with the invention as set forth below.) The inverse operation of ARK is ARK itself, the inverse operation of SB is the inverse subbyte (ISB) which is basically another TLU, the inverse operation of MC is the inverse mix column (IMC) which is basically another TLU, and the inverse operation of SR is the inverse shift row (ISR) which is another move from one byte location to another.

Expressed schematically, AES decryption is as follows:
ARK (K10)
ISR
ISB
ARK (K9)
IMC
ISR
ISB
ARK (K8)
IMC
ISR
ISB
ARK (K7)
IMC
ISR
ISB
ARK (K6)
IMC
ISR
ISB ARK (K5)
IMC
ISR
ISB
ARK (K4)
IMC
ISR
ISB
ARK (K3)
IMC
ISR
ISB
ARK (K2)
IMC
ISR
ISB
ARK (K1)
IMC
ISR
ISB
ARK (K0)

Without lack of generality, the exemplary description here of the present method is for decryption, but it is evident that the method in accordance with the invention can be used also for encryption (see FIG. 1 showing conventional AES encryption) or other cryptographic processes. The method in accordance with the invention also can easily be applied to other variants of AES with more rounds (the 192 and 256-bit key length versions) as well as to other block ciphers and more generally to non-block ciphers and other key based cryptographic processes.

AES is considered very efficient in terms of execution on many different computer architectures since it can be executed only with table lookups (TLU) and the exclusive-or (XOR) operation. It is known that the AES state can be handled as a 4×4 square of bytes. As a square, it can be seen as 4 columns of 4 bytes each.

As described above, AES decryption is a succession of basic operations: ISB for the inverse of SubByte, IMC (for the inverse of MixColumn) and ISR (for the inverse of ShiftRow). The ISR operation modifies the state by shifting each row of the square. This operation does not modify the bytes themselves but only their respective positions. The ISB operation is a permutation from [0, 255] to [0, 255], which can be implemented by a table look-up.

The IMC operation is a bijective linear function from a column (4B) to a column. As a linear function, it accepts a matrix as a representation expressed as:
[0e, 09, 0d, 0b]
[0b, 0e, 09, 0d]
[0d, 0b, 0e, 09]
[09, 0d, 0b, 0e]
where each coefficient in this matrix represents a linear function applied to a byte. For a vector [w, x, y, z] of four bytes, the output of operation IMC is expressed as:
[[0e.w XOR 09.x XOR 0d.y XOR 0b.z],
[0b.w XOR 0e.x XOR 09.y XOR 0d.z],
[0d.w XOR 0b.x XOR 0e.y XOR 09.z],
[09.w XOR 0d.x XOR 0b.y XOR 0e.z]]

In order to be implemented efficiently, one needs to modify the order of the operations executed in AES decryption. Since IMC is a linear operation and since the ARK operation consists of logically XORing a constant to the AES state, these operations can be permuted. This idea is known and is used often in optimized AES decryption implementations.

However, this implies a modification of the keys used in the ARK operation. Let Ki be the 16-Byte subkey used in the round designated by index value i and let Ki1, Ki2, Ki3 and Ki4 be the four sets of four bytes of the keys related to the columns of the AES state. By definition, $$Ki=[Ki1,Ki2,Ki3,Ki4].$$

The normal flow of operations for an AES decryption is expressed as:
ARK ([Ki1, Ki2, Ki3, Ki4])
IMC
But this is equivalent to:
IMC
ARK ([IMC(Ki1), IMC(Ki2), IMC(Ki3), IMC(Ki4)])
because operation IMC is linear.

For this reason, the AES decryption is expressed schematically as:
ARK (K10)
ISR
ISB
IMC
ARK (Kx9)
ISR
ISB
IMC
ARK (Kx8)
ISR
ISB
IMC
ARK (Kx7)
ISR
ISB
IMC
ARK (Kx6)
ISR
ISB
IMC
ARK (Kx5)
ISR
ISB
IMC
ARK (Kx4)
ISR
ISB
IMC
ARK (Kx3)
ISR
ISB
IMC
ARK (Kx2)
ISR
ISB
IMC
ARK (Kx1)
ISR
ISB
ARK (K0)

where Kxi is the subround key designated above Ki and modified as explained above (with the application of the IMC operation to it). So in this new flow of operations, each ISB operation is followed by an IMC operation except for the ISB operation between keys Kx1 and K0. This property improves efficiency between K10 and K1. Note that the computation of keys Kxi can be done in the key initialization phase.

Let IS be the function applying operation ISB on a byte and let "→" define the function "x→f(x)" meaning "x becomes f(x)" so:
IS1 is the function on x: x→09.IS(x)
IS2 is the function on x: x→0b.IS(x)

IS3 is the function on x: x→0d.IS(x)
IS4 is the function on x: x→0e.IS(x)

These functions are permutations from [0, 255] to [0, 255] and are implemented by a table look-up.

Applying operations ISB and IMC to a vector designated [w, x, y, z] as in the previous example is done by computing:
[[IS4(w) XOR IS1(x) XOR IS3(y) XOR IS2(z)],
[IS2(w) XOR IS4(x) XOR IS1(y) XOR IS3(z)],
[IS3(w) XOR IS2(x) XOR IS4(y) XOR IS1(z)],
[IS1(w) XOR IS3(x) XOR IS2(y) XOR IS4(z)]]

So to apply the operations ISB and IMC during the rounds 10 to 1, it is sufficient to apply the functions IS1 to IS4 to each byte. The output bytes remain to be logically XORed together to obtain the output of the function, as shown in the example.

Note that the final decryption round is different since no IMC operation is used. This implies that instead of using the operations ISi, it suffices to replace them by the operation IS.

To sum up, the AES decryption is understood as a sequence of ARK and (ISB-IMC) operations. The (ISB-IMC) operation is done by table look-up and XOR operations. This last operation is implemented with 64 table look ups for each round (4 for each byte) and 48 XOR operations.

AES Properties

The following describes known properties of components of the AES cipher that are used in the present method to improve security of the AES (or any similar) cipher. The SubByte (SB) operation was intentionally chosen by the designers of the AES cipher. As well known, in the SB operation, each data byte in the array (state) is updated using an 8-bit substitution box called the S-box. The S-box is a result of a multiplication inverse in the Galois Field of 256, referred to as GF ($2^8$), to provide nonlinearity to the cipher. The S-box combines the inverse function extended to 0 with an invertible affine function. SubByte thus is a function GF($2^8$). A Galois field in mathematics is a field (e.g., a set) that contains only a finite number of elements, called the "order". So for the operation in GF($2^8$):

$$SB(x) = A(x^{254})$$

where A is the given affine function (see the AES cipher specification) and x is the cipher state value. This is on a byte considered as an element of GF($2^8$). An affine function performs an affine transformation on its argument (e.g., a vector) to linearly transform (rotate or scale) and translate X (shift) the argument to another vector. The notation A(X) means the affine function applied to value X.

One can then write in terms of the cipher operations SB, ISB:

$$SB = A \circ INV,$$

and $$ISB = INV \circ A^{-1}$$

where INV is the multiplicative inversion in GF($2^8$), $A^{-1}$ is the inverse of the affine function A, and symbol "$\circ$" designates a composition of functions. (Multiplicative inversion here means conventionally that the inversion of x is 1/x, unless x=0 when $1/x = x^{254}$.) Due to this equality, there are some useful properties of input and output masks that may be applied to SB and ISB and the other cipher operations.

Let $M_\lambda$ designate the linear matrix that computes in GF($2^8$) the multiplication by element $\lambda$, where $\lambda$ is a non-zero element (member) of GF($2^8$). Since this is a multiplication and since $\lambda \neq 0$, it has the following property:

$$INV \circ M_\lambda = K_{1/\lambda} \circ INV$$

where $1/\lambda$ is 1 divided by the value of $\lambda$ in GF($2^8$).

From this equality, one derives:

$$SB \cdot M_\lambda = A \cdot M_{1/\lambda} \cdot A^{-1} \cdot SB$$
$$= N_{1/\lambda} \cdot SB$$

where $N_{1/\lambda}$ also designates a linear permutation expressed as a matrix. This means that certain linear permutations applied on the state input of operation SB, for instance to mask the state, imply a linear output mask on the output state of operation SB, that also masks the state. So here the masking involves multiplying the state value to be masked by $\lambda$. Unmasking (recovery of the original state value) involves multiplying by the inverse of $\lambda$, expressed as $1/\lambda$ or $\lambda^{-1}$.

The equivalent relation for the ISB operation is:

$$ISB \circ N_{1/\lambda} = M_\lambda \circ ISB$$

A similar property allowing use of multiplicative masks in GF($2^8$) exists for the functions designated fi:

$$fi: x \rightarrow x^{2^i}, \text{ for } i \text{ in the set } [1, 7].$$

These seven functions in GF($2^8$) in mathematics are called field automorphisms and it is known that they correspond to linear permutations. They can be represented by matrices designated Fi. There is a similar relation between these correspondences and the AES SB cipher operation:

$$SB \cdot Fi = A \cdot F_i \cdot A^{-1} \cdot SB$$
$$= G_i \cdot SB$$

where $G_i$ is a linear permutation as well.

If $MF_{\lambda,i}$ denotes the matrix:

$$MF_{\lambda,i} = M_\lambda \circ F_i$$

then:

$$SB \cdot MF_{\lambda,i} = A \cdot MF_{1/\lambda,i} \cdot A^{-1} \cdot SB$$
$$=: NG_{1/\lambda,i} \cdot SB,$$

where "$=:$" means the definition of $NG_{1/\lambda,i}$

Present Method—Example of AES Decryption

Since it is convenient in accordance with the invention to manipulate the input mask of the ISB operation (but this is not limiting), here the conventional AES decryption operations (described above) are re-ordered or grouped as follows:
ARK (K10)
ISB
IMC
ARK (Kx9)
ISB
IMC
ARK (Kx8)
...
ISB
IMC
ARK (Kx1)
ISR
ISB
ARK (K0)

The operations are grouped this way here because even if one does not know how the sequence of operations:

ISB
IMC
ARK
is implemented, the present masking methods can still be used. Due to the above described mathematical properties of AES or similar ciphers, the link between the input mask value and output mask value for any operations is independent of the operations' sequence.

The following is an example (for the first AES decryption round) of application of the input and output mask values for each cipher operation in accordance with the invention:

| Operation | State Input Mask Value | State Output Mask Value |
|---|---|---|
| ARK ($NG_{1/\lambda,i}$ (K10)) | $NG_{1/\lambda,i}$ | $NG_{1/\lambda,i}$ |
| ISB | $NG_{1/\lambda,i}$ | $MF_{\lambda,i}$ |
| IMC | $MF_{\lambda,i}$ | $MF_{\lambda,i}$ |
| ARK ($MF_{\lambda,i}$(Kx9)) | $MF_{\lambda,i}$ | $MF_{\lambda,i}$ |

The ISB and IMC operations are each conventional, while the round keys K10 and Kx9 (respectively used for the ARK operations for input and output states to ISB) are themselves multiplicably masked respectively with mask permutations $NG_{1/\lambda,i}$ and $MF_{\lambda,i}$. So here non-static (dynamic) mask values are multiplicably applied to each state, but the cipher operations ISB, IMC and ARK themselves are static (do not change.) It does not matter how the round is executed. Note for the first AES round this is done differently since the round key K10 is expressed as ARK ($NG_{1/\lambda,i}$(K10)). This ensures that the input state to the following ISB operation has the correct mask value.

It is also possible to provide dynamic (changing over time) masking. Assume that the input mask value of a cipher round is $NG_{1/\lambda,i}$ then:

| Operation | State Input Mask | State Output Mask |
|---|---|---|
| ISB | $NG_{1/\lambda,i}$ | $MF_{\lambda,i}$ |
| IMC | $MF_{\lambda,i}$ | $MF_{\lambda,i}$ |
| ARK (Kx8) | $MF_{\lambda,i}$ | $MF_{\lambda,i}$ XOR Kx8 XOR $MF_{\lambda,i}$ (Kx8) |

This is not only valid for Kx8 but for any Kxj with j≠10. So after the round, it is necessary to compute XOR Kx8 XOR $MF_{\lambda,i}$ (Kx8) of the state to obtain a state with the mask $MF_{1/\lambda,i}$ applied.

Then to obtain an input mask $NG_{1/\lambda',j}$ for the next cipher round, it is necessary to apply the next operation:

$$(MF_{\lambda,j})^{-1} \circ NG_{1/\lambda',j} = (MF_{\lambda,i})^{-1} \circ A \circ MF_{1/\lambda',j} \circ A^{-1}$$

One can then apply the same process to all cipher rounds, so:

$$(MF_{\lambda,i})^{-1} = (M_\lambda \circ F_i)^{-1} = F_{8-i} \circ M_{1/\lambda} = Mi/\lambda^{2^{-(8-i)}} \circ F_{8-i}$$

where $F_8$ is equal to $F_0$ (since the subtraction is performed modulo 8 for $GF(2^8)$).

Let $Cst_{a,b}$ be defined as:

$$Cst_{a,b} := (MF_{\lambda a, ia})^{-1} \circ NG_{1/\lambda b', ib}(Kxb \text{ XOR } MF_{\lambda a, ia}(Kx_b))$$

To illustrate execution of this process in the form of pseudo-code (a non-executable portrayal of actual computer code), assume that mask values $\lambda_{10}$ and $\lambda_9$ are precomputed:
  for a block of input data, compute $\lambda_8$ and precompute:

$$Cst_{9,8} = (MF_{\lambda 9, i9})^{-1} \circ NG_{1/\lambda 8', i8}(Kx9 \text{ XOR } MF_{\lambda 9, i9}(Kx8))$$

Execute the round key K10–K9 cipher round
Apply $(MF_{\lambda,9,i9})^{-1} \circ NG_{1/\lambda,8',i8}$ to the state
Apply XOR $Cst_{9,8}$ to the state
Execute the K8 round key cipher round
For all cipher rounds where the round index is r (where the size of the r loop depends on the version of AES):
  From the output data of ARK(Kxr):
    compute $k_{r-2}$
    compute $Cst_{r-1, r-2}$
    apply $MF_{1/\lambda,r,ir} \circ NG_{1/\lambda,r-1,ir-1}$
    XOR $Cst_{r,r-i}$
Execute the cipher round r by conventional application of the inverseSubByte (ISB), and inverseMixColumn (IMC) operations.

This approach can be also used in combination with the "P world" approach to cryptographic obfuscation (see commonly owned U.S. patent application Ser. No. 12/972,145, filed Dec. 17, 2010, entitled "Securing Keys of a Cipher using Properties of the Cipher Process" incorporated herein by reference in its entirety) and with conventional XOR applied masks as well.

There are no other intermediate states that are a direct function of the clear state (which is the state of a non-White Box implementation of the AES cipher having the same execution applied on the same key and message.) Indeed, here each byte depends at all times on the previous state, due to the chained values $\lambda_i$ and i. In particular, this violates the assumption made in the above mentioned Billet et al. attack that the White Box state is necessarily a static function (a function that is independent of the input message) of the clear state, so the Billet et al. attack is thereby defeated.

Note that performing the computation in the above pseudo-code in the order:
  apply $MF_{1/\lambda,r,ir} \circ NG_{1/\lambda,r-1,ir-1}$ then
  XOR $Cst_{r,r-i}$
is important. If instead the XOR $Cst_{r,r-i}$ step is applied before the linear permutation, and if the linear permutation is performed in two steps (first N and then M), the values' correlations with the clear state are available to a White Box environment attacker, thereby compromising security because the Billet et al. attack can be mounted successfully.

With this approach, the Billet et al. attack is rendered much more complex. Indeed, an attacker must first find value λ in order to mount his attack, so he needs to test (for $GF(2^8)$) 255 different values of λ and the 8 values of i to succeed. This leads to a final complexity of about $2^{35} = 255 * 8 * 2^{24}$ computations, with $2^{24}$ being the relative complexity of the Billet et al. attack. The complexity can be made even greater, since it is possible to generalize to four different couples (λ,i) for each round, one couple per column of the AES cipher state. This leads to an attack of relative complexity $2^{68}$. It is possible to use other Galois fields such as $GF(2^{16})$ or $GF(2^{32})$ or $GF(2^{64})$, although much more computational power would be needed.

Efficient Application of $MF_{\lambda,i} \circ NG_{\lambda',i'}$

It is desirable to compute efficiently $MF_{1/\lambda,r,ir} \circ NG_{1/\lambda,r-1,ir-1}$. Efficient means a method that does not require computing all the tables $MF_{1/\lambda,r,ir} \circ NG_{1/\lambda,r-1,ir-1}$ (here there are about 8×255=2,040 such functions), in order to modify these masks as quickly as possible.

The field $GF(2^8)$ by definition has a multiplicative group structure. This multiplicative group is also cyclic, meaning there exist generators g (integers which are elements of $GF(2^8)$) such that all non-zero elements X of the field can be computed as:

$$X = g^x$$

with x being a member of the set [0, 254].

Due to this property, the λ multiplication operation in GF($2^8$) to do the masking can be efficiently implemented as follows:
Let L and E be the conventional mathematical functions such that:

$$L(X)=x$$

$$E(x)=g^x,$$

so L is the conventional mathematical logarithm operation, and E is the conventional mathematical exponentiation (power of) operation in base g.

The following describes in more detail the operations in the above pseudo-code. Using functions L and E, for $X \neq 0 \neq Y$:

$$X*Y=E(L(X)+L(Y) \bmod 255),$$

since as well known adding logarithms is a way of performing multiplication. As also well known, addition performed in computer hardware or software is much faster than multiplication (which is done by repeated additions). So these functions allow efficient implementation of the multiplication masking operation in GF($2^8$) by performing only: 3 table lookups (E once and L twice), 1 addition, and 1 modulo operation. The special case of 0 is treated separately since $0*X=0$ (since there is no logarithm of zero).

Applied to the execution of $M_\lambda$ on X from L(λ), this is expressed as:

$$M_\lambda(X)=E(L(X)+L(\lambda) \bmod 255), \text{ if } X \neq 0$$

$$M_\lambda(0)=0, \text{ if } X=0$$

This can be done for all values of X in the set [0, 255].

Applied to the execution of $F_i$ (see above where F designates the GF($2^8$) automorphisms), this is:

$$F_i(X)=E(2^i*L(X) \bmod 255), \text{ if } X \neq 0$$

$$F_i(0)=0, \text{ if } X=0$$

To implement the computation of $MF_{\lambda,i} \circ NG_{\lambda',i'}$, (as explained above) compute:

$$M_\lambda \circ F_i \circ A \circ M_{\lambda'} \circ F_{i'} \circ A^{-1}$$

This implies knowing the tables representing A and $A^{-1}$ and applying successively:
$A^{-1}$
the multiplication by λ', as explained above for $M_\lambda(X)$
the application of $F_{i'}$, as explained above for $F_i(X)$
A
the multiplication by λ, as explained above for $M_\lambda(X)$
the application of $F_i$, as explained above for $F_i(X)$
So implementing this requires only 3 table lookups and several arithmetical operations modulo 255.

Note that there exist multiple examples of the tables expressing L and E, such that a multiplication by λ can use different tables. This is a consequence of there being different generators for GF($2^8$)*, where here "*" denotes the invertible elements of GF($2^8$). Certain elements of GF($2^8$) can be a generator, except 0 and 1. (Only 128 elements can be generators.) This is a way to implement dynamic masks.

Additional Elements: Using L and E for the Entire AES Process

To use the lookup tables for all inputs, one first defines these functions for the special value 0. Let:

$$L(0)=255$$

$$E(255)=0$$

This way it is established that even 0 has an image through function L and can be returned to the non-logarithmic world by applying function E. In mathematics, if x is a member of set X, then for a function f, f(x) is the "image" of x. So the image of f is the set included in set X of all the f(x), for all the members x in X. Define here the "L world" as the realm of the image of L (the logarithm operation).

Applying Permutations to the L (Logarithm) World

Let L be expressed as a permutation, then a permutation designated P in the "real" world is designated $P_L$ in the L world and defined as:

$$P_L(x)=L(P(E(x)))$$

where as before the logarithm operation is L(X)=x.

This gives the function equality:

$$P_L = L \circ P \circ E$$

So any function or permutation performed in the "real" (unmasked) world can be translated into the L world.

Multiplication in the L World

As explained above, a multiplication is performed as a modular addition e.g. modulus 255, in the L (logarithm) world. This makes this operation efficient in terms of computer software and/or hardware. Note the need to take care of the special value 0 case, since as explained before, for value 0, the above addition method does not work. One manages this 0 value case separately as explained above.

XOR in the L world

To compute the value of X XOR Y (the Boolean exclusive OR operation performed on two arguments designated X and Y) in the L world (designated here $XOR_L$), an additional table is needed.

Let $1_L$ be the function:

$$1_L(x)=L(1 \text{ XOR } E(x))$$

Use the array associated with this function to perform the computation of $XOR_L$. Assume that $X \neq 0 \neq Y$, then:

$$X \text{ XOR } Y = X*(1 \text{ XOR } X^{-1}*Y)$$

So for x, $y \neq 255$ (in GF($2^8$)):

$$x \text{ XOR}_L y = x + (1_L((y-x) \bmod 255)) \bmod 255$$

For x=255:

$$x \text{ XOR}_L y = y$$

The $XOR_L$ operation (that is, XOR in the L world) requires only these operations: 1 addition, 1 subtraction, 2 modulo operations and 1 table lookup.

Note that the $XOR_L$ operation may be computed from $Z_L$ arrays (where $Z_L$ is a generalization of $1_L$ for values other than 1) as well, using the equations for any invertible element Z in (GF($2^8$)):

$$X \text{ XOR } Y = X*Z^{-1}*(Z \text{ XOR}(X^{-1}*y*Z))$$

$$x \text{ XOR}_L y = x - z + (Z_L((y+z-x) \bmod 255)) \bmod 255$$

With these three methods, one implements the AES cipher in the L world. In particular, in this L world, all logical XOR operations can be eliminated, which enhances security since the associated software code thereby is quite different from that for a conventional AES cipher implementation. Another point is that the L world can be applied directly to any implementation of the AES cipher, masked statically and/or dynamically, with XOR masks or linear permutations applied.

The XOR computation also can be "randomized" during execution of the code, since one can switch at any time to the $1_L$ or to the $Z_L$ table lookups. So at any time in the code execution, one can randomly change over to the L world, making understanding by an attacker more complicated.

This causes a small performance degradation of the code execution, since the XOR operations in this L world are more complicated than a straightforward computation. However, this degradation is acceptable in practice in view of the security added by this implementation.

Figure 2:
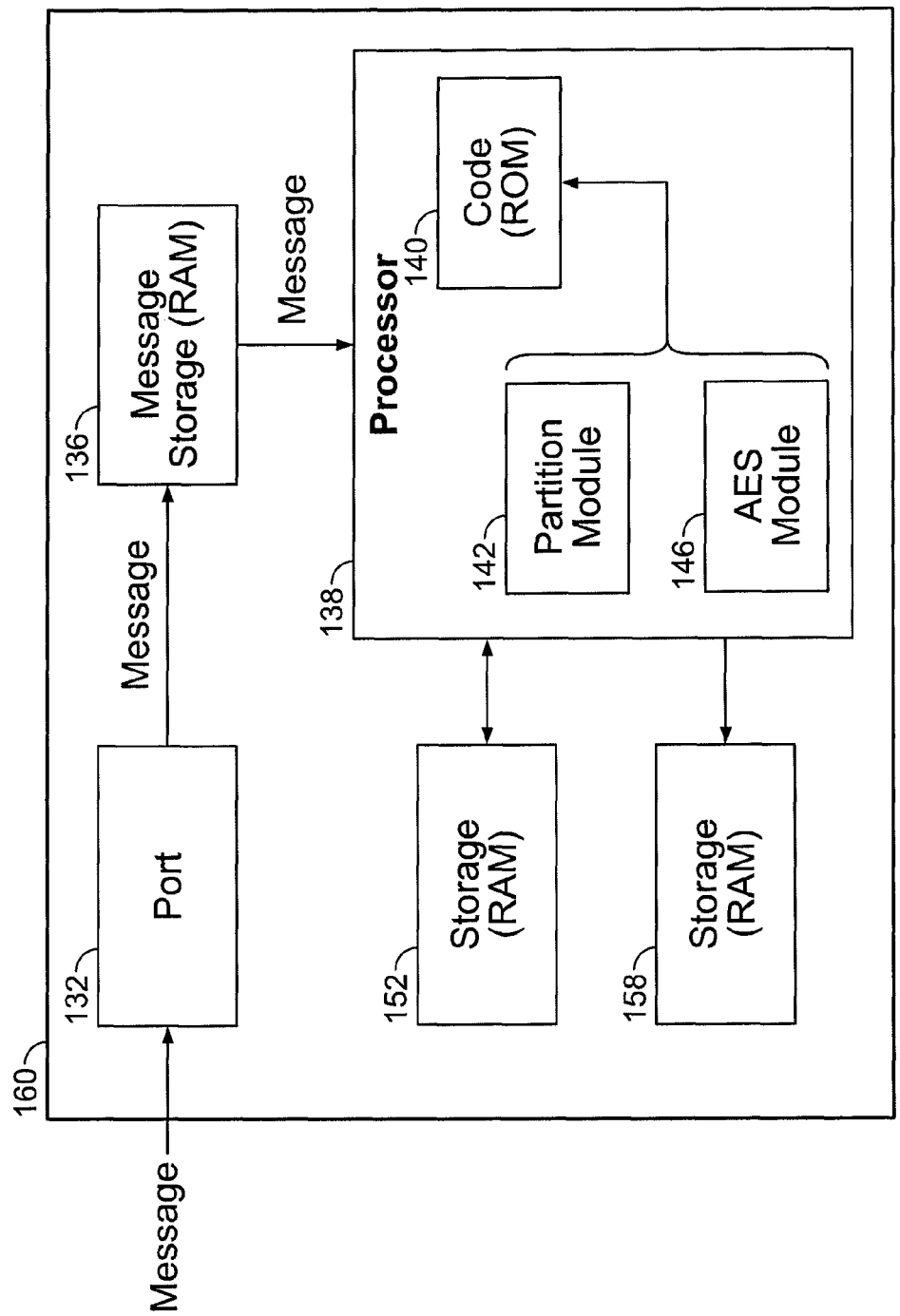
FIG. 2 shows a computing system in accordance with the invention.

FIG. 2 shows in a block diagram relevant portions of a computing device (system) 160 in accordance with the invention which carries out the cryptographic processes as described above. This is, e.g., a server platform, computer, mobile telephone, Smart Phone, personal digital assistant or similar device, or part of such a device and includes conventional hardware components executing in one embodiment software (computer code) which carries out the above examples. This code may be, e.g., in the C or C++ computer language or its functionality may be expressed in the form of firmware or hardware logic; writing such code or designing such logic would be routine in light of the above examples and logical expressions. Of course, the above examples are not limiting. Only relevant portions of this apparatus are shown for simplicity. Essentially a similar apparatus encrypts the message, and may indeed be part of the same platform.

The computer code is conventionally stored in code memory (computer readable storage medium) 140 (as object code or source code) associated with conventional processor 138 for execution by processor 138. The incoming ciphertext (or plaintext) message (in digital form) is received at port 132 and stored in computer readable storage (memory 136 where it is coupled to processor 138. Processor 138 conventionally then partitions the message into suitable sized blocks at partitioning module 142. Another software (code) module in processor 138 is the decryption (or encryption) module 146 which carries out the masking and decryption or encryption functions set forth above, with its associated computer readable storage (memory) 152.

Also coupled to processor 138 is a computer readable storage (memory) 158 for the resulting decrypted plaintext (or encrypted ciphertext) message. Storage locations 136, 140, 152, 158 may be in one or several conventional physical memory devices (such as semiconductor RAM or its variants or a hard disk drive). Electric signals conventionally are carried between the various elements of FIG. 6. Not shown in FIG. 2 is any subsequent conventional use of the resulting plaintext or ciphertext stored in storage 145.

Figure 3:
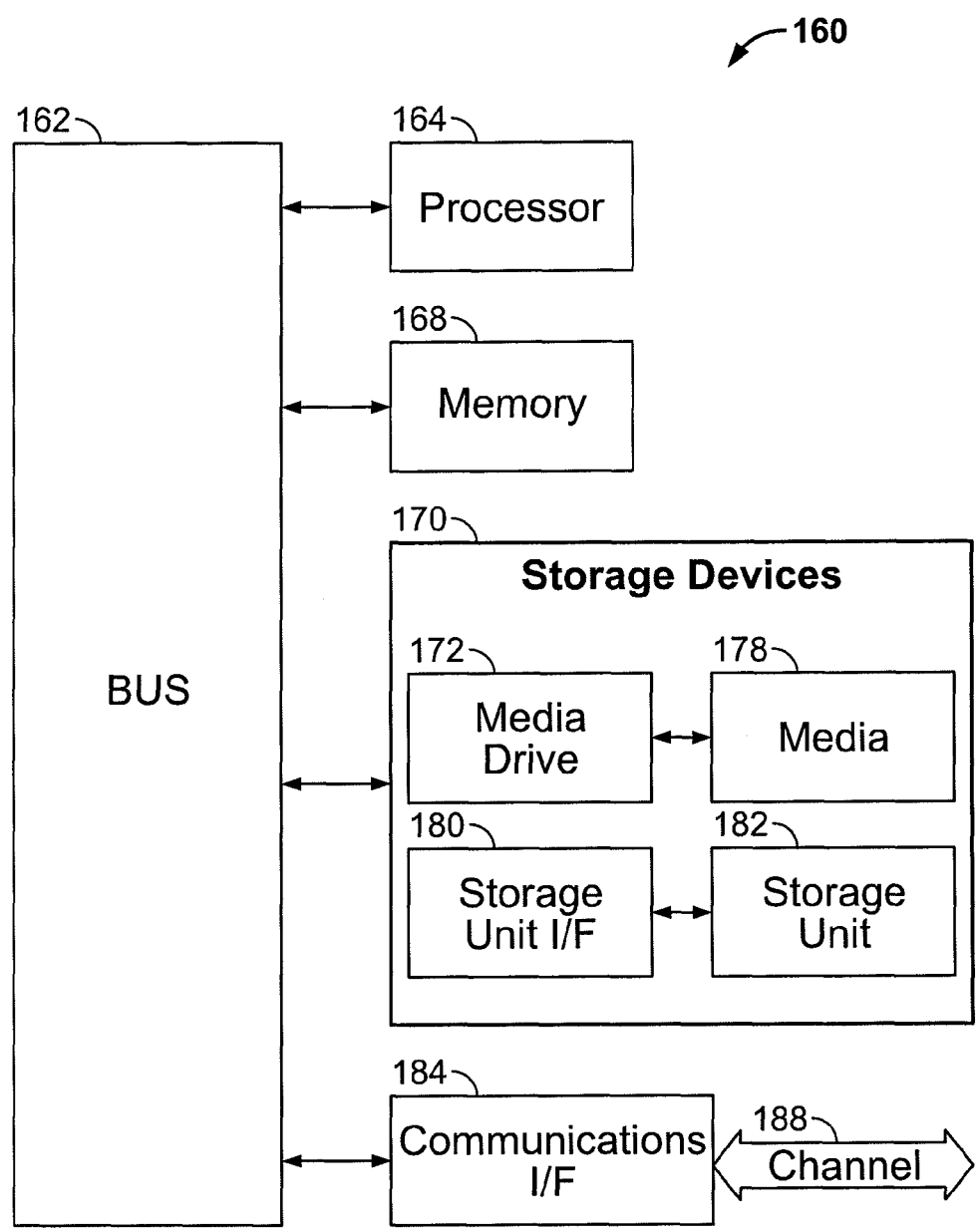
FIG. 3 shows a computing system as known in the art and used in accordance with the invention.

FIG. 3 illustrates detail of a typical and conventional embodiment of computing system 160 that may be employed to implement processing functionality in embodiments of the invention as indicated in FIG. 2 and includes corresponding elements. Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164 (equivalent to processor 138 in FIG. 2). Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168 (equivalent of memories 136, 140, 152, and 158), such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 72. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184 (equivalent to part 132 in FIG. 2). Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method of performing a cryptographic process having a plurality of operations on a message, the method comprising:
    receiving the message at a port;
    storing the message in a first computer readable storage coupled to the port;
    at a processor coupled to the first computer readable storage, applying a plurality of cipher operations sequentially to the message thereby generating a state for each operation;
    applying, for at least one of the operations, an input mask value and an output mask value to respectively an input and output value of the state, wherein each mask value is applied by adding a logarithm of the mask value to a logarithm of the state value, modulus a predetermined number, in order to perform an arithmetic multiplication; and
    storing each state in a second computer readable storage coupled to the processor.

2. The method of claim 1, wherein applying the mask value to the state further comprises determining an exponentiation of the added logarithms.

3. The method of claim 2, wherein applying the mask value to the state further comprises determining each logarithm and exponentiation by a table lookup.

4. The method of claim 3 further comprising providing a plurality of tables for the table lookups, each table having a different generator value.

5. The method of claim 4 further comprising, during execution of the cryptographic process, changing between the plurality of tables.

6. The method of claim 1, wherein the cryptographic process is a block cipher which comprises a plurality of rounds, each round having an associated round key, each round comprising the plurality of cipher operations.

7. The method of claim 6, wherein each round comprises at least three of an add round key operation, a mix column operation, a subbyte operation, and a shift row operation, or an inverse thereof.

8. The method of claim 6, wherein at least one of the cipher operations comprises a logical exclusive-OR operation applied to a state and a round key, and further comprising masking the exclusive-OR operation by determining a difference between the state and the round key and determining a logarithm of the difference, modulus a predetermined number.

9. The method of claim 8, wherein at least some of the masked cryptographic operations comprise no logical exclusive OR operations.

10. The method of claim 1, wherein the cryptographic process is encryption or decryption and the message is respectively a cleartext or a ciphertext.

11. The method of claim 1, wherein each of the mask values is a member of a Galois Field of a predetermined number, and wherein for each non-zero element X in the Galois field, there is a generator value g such that:

$X = g^x$ where $x$ is in the range of 0 to the predetermined number.

12. The method of claim 11 further comprising unmasking the resulting masked value of the state by multiplying the masked value of the state by an inverse of the member of the Galois Field.

13. A method of performing a cryptographic process having a plurality of operations on a message, the method comprising:
    receiving the message at a port;
    storing the message in a first computer readable storage coupled to the port;
    at a processor coupled to the first computer readable storage, applying a plurality of cipher operations sequentially to the message thereby generating a state for each operation;
    applying, for at least one of the operations, an input mask value and an output mask value to respectively an input and output value of the state, wherein each mask value is applied by multiplying the mask value and the state value; and
    storing each state in a second computer readable storage coupled to the processor, wherein at least one of the cryptographic operations comprises a permutation of the state performed as a logarithm of a permutation of an exponentiation of the state.

14. The method of claim 13, wherein the cryptographic process is a block cipher which comprises a plurality of rounds, each round having an associated round key, each round comprising the plurality of cipher operations, the method further comprising masking at least one of the round keys by applying a multiplicative mask value to the round key.

15. The method of claim 14, wherein an input mask value and an output mask value are each applied to the round key.

16. The method of claim 15, further comprising, for each round of the block cipher, applying a different input mask value to the round key.

17. The method of claim 16, wherein for each round, the input mask value is a composition of the output mask value for the previous round with an affine function.

18. An apparatus for performing a cryptographic process having a plurality of operations on a message, the apparatus comprising:
    a port adapted for receiving the message;
    a set of processing units for executing sets of instructions;
    a first computer readable storage coupled to the port and adapted to store the received message;
    a second computer readable storage for storing a program which when executed by at least one of the processing units performs the cryptographic process on the message, the program comprising sets of instructions for:
        applying a plurality of cipher operations sequentially to the message, thereby generating a state for each operation; and
        applying, for at least one of the plurality of operations, an input mask value and an output mask value respectively to an input and output value of the state, wherein each mask value is applied by adding a logarithm of the mask value to a logarithm of the state value, modulus a predetermined number, in order to perform an arithmetic multiplication; and a third computer readable storage coupled to the processor and adapted to store each state value.

19. The apparatus of claim 18, wherein the mask value is applied to the state further by determining an exponentiation of the added logarithms.

20. The apparatus of claim 19, wherein the mask value is applied to the state by determining each logarithm and exponentiation by a table lookup.

21. The apparatus of claim 20, wherein the program further comprises a set of instructions for providing a plurality of tables for the table lookups, each table having a different generator value.

22. The apparatus of claim 21, wherein the program further comprises a set of instructions for changing, during execution of the cryptographic process, between the plurality of tables.

23. The apparatus of claim 18, wherein the cryptographic process is a block cipher which comprises a plurality of rounds, each round having an associated round key, each round comprising the plurality of cipher operation.

24. The apparatus of claim 23, wherein each round comprises at least three of an add round key operation, a mix column operation, a subbyte operation, and a shift row operation, or an inverse thereof.

25. The apparatus of claim 18, wherein the cryptographic process is encryption or decryption and the message is respectively a cleartext or a ciphertext.

26. The apparatus of claim 18, wherein each of the mask values is a member of the Galois Field of a predetermined number, and wherein for each non-zero element X in the Galois field, there is a generator value g such that:

$X=g^x$ where $x$ is in the range of 0 to the predetermined number.

27. The apparatus of claim 26, wherein the program further comprises a set of instructions for unmasking the resulting masked value of the state by multiplying the masked value of the state by an inverse of the member of the Galois Field.

28. The apparatus of claim 18, wherein at least one of the plurality of cipher operations comprises a logical exclusive-OR operation applied to a state and a round key, wherein the program further comprises a set of instructions for masking the exclusive-OR operation by determining a difference between the state and the round key and determining a logarithm of the difference, modulus a predetermined number.

29. The apparatus of claim 28, wherein at least some of the masked cryptographic operations comprise no logical exclusive OR operations.

30. An apparatus for performing a cryptographic process having a plurality of operations on a message, the apparatus comprising:

a port adapted for receiving the message;

a set of processing units for executing sets of instructions;

a first computer readable storage coupled to the port and adapted to store the received message;

a second computer readable storage for storing a program which when executed by at least one of the processing units performs the cryptographic process on the message, the program comprising sets of instructions for:

applying a plurality of cipher operations sequentially to the message, thereby generating a state for each operation;

applying, for at least one of the plurality of operations, an input mask value and an output mask value respectively to an input and output value of the state, wherein each mask value is applied by multiplying the mask value and the state value, wherein at least one of the cryptographic operations comprises a permutation of the state performed as a logarithm of a permutation of an exponentiation of the state; and a third computer readable storage coupled to the processor and adapted to store each state value.

31. The apparatus of claim 30, wherein the cryptographic process is a block cipher which comprises a plurality of rounds, each round having an associated round key, each round comprising the plurality of cipher operations, the program further comprising a set of instructions for masking at least one of the round keys by applying a multiplicative mask value to the round key.

32. The apparatus of claim 31, wherein an input mask value and an output mask value are each applied to the round key.

33. The apparatus of claim 32, wherein the program further comprises a set of instructions for applying, for each round of the cipher, a different input mask value to the round key.

34. The apparatus of claim 33, wherein for each round, the input mask value is a composition of the output mask value for the previous round with an affine function.

* * * * *